(12) United States Patent
Copeland

(10) Patent No.: US 7,973,661 B2
(45) Date of Patent: Jul. 5, 2011

(54) DETACHER SYSTEM AND METHOD HAVING AN RFID ANTENNA FOR A COMBINATION EAS AND RFID TAG

(75) Inventor: Richard L. Copeland, Lake Worth, FL (US)

(73) Assignee: Sensomatic Electronics, LLC, Boca Raton, FL (US)

(*) Notice: Subject to any disclaimer, the term of this patent is extended or adjusted under 35 U.S.C. 154(b) by 474 days.

(21) Appl. No.: 12/043,288

(22) Filed: Mar. 6, 2008

(65) Prior Publication Data

US 2009/0224918 A1 Sep. 10, 2009

(51) Int. Cl.
*G08B 13/14* (2006.01)

(52) U.S. Cl. .................. 340/572.1; 340/10.1; 340/10.5; 340/505

(58) Field of Classification Search ............. 340/572, 340/10, 505
See application file for complete search history.

(56) References Cited

U.S. PATENT DOCUMENTS

| | | | |
|---|---|---|---|
| 5,426,419 A | | 6/1995 | Nguyen et al. |
| 5,942,978 A | * | 8/1999 | Shafer ..................... 340/572.9 |
| 5,955,951 A | * | 9/1999 | Wischerop et al. ........ 340/572.8 |
| 6,429,776 B1 | * | 8/2002 | Alicot et al. ............... 340/572.1 |
| 7,692,543 B2 | * | 4/2010 | Copeland et al. .......... 340/572.1 |
| 7,701,343 B2 | * | 4/2010 | Copeland et al. .......... 340/572.1 |
| 2002/0105424 A1 | * | 8/2002 | Alicot et al. ............... 340/572.1 |
| 2007/0125140 A1 | | 6/2007 | Ho |
| 2007/0262865 A1 | * | 11/2007 | Copeland et al. .......... 340/572.7 |
| 2007/0296594 A1 | * | 12/2007 | Copeland et al. .......... 340/572.7 |

FOREIGN PATENT DOCUMENTS

| | | |
|---|---|---|
| WO | 2005083655 A3 | 9/2005 |
| WO | 2006055653 A1 | 5/2006 |
| WO | WO 2006/050407 A1 | 5/2006 |
| WO | WO 2006/050462 A1 | 5/2006 |
| WO | 2007084989 A3 | 7/2007 |

OTHER PUBLICATIONS

International Search Report and Written Opinion dated Jun. 24, 2009 for International Application No. PCT/US2009/001462, International Filing Date Mar. 5, 2009 (14-pages).

* cited by examiner

*Primary Examiner* — Travis R Hunnings
(74) *Attorney, Agent, or Firm* — Alan M. Weisberg; Christopher & Weisberg, P.A.

(57) ABSTRACT

A detacher unit for disengaging a combination EAS/RFID tag from its article. The detaching unit detaches the spring clamp mechanism of a combination EAS/RFID tag when the tag is placed within a particular region within the detaching unit. A near field magnetic loop antenna is situated within the placement region in a housing. When the combination EAS/RFID tag is placed within the placement region just above the near field magnetic loop antenna, the RFID code of the tag is read and the detachment unit releases the clamp mechanism that attaches the EAS/RFID tag to its article.

19 Claims, 6 Drawing Sheets

DETACHER SYSTEM AND METHOD HAVING AN RFID ANTENNA FOR A COMBINATION EAS AND RFID TAG

CROSS-REFERENCE TO RELATED APPLICATION n/a

STATEMENT REGARDING FEDERALLY SPONSORED RESEARCH OR DEVELOPMENT n/a

FIELD OF THE INVENTION

The present invention relates to EAS tags and specifically, to a method and system for detaching a spring clamp mechanism on a combination EAS/RFID tag.

BACKGROUND OF THE INVENTION

Electronic article surveillance ("EAS") systems are generally known in the art for the prevention or deterrence of unauthorized removal of articles from a controlled area. In a typical EAS system, EAS tags, markers and labels (collectively "tags") are designed to interact with an electromagnetic field located at the exits of the controlled area, such as a retail store. These EAS tags are attached to the articles to be protected. If an EAS tag is brought into the electromagnetic field or "detection zone," the presence of the tag is detected and appropriate action is taken, such as generating an alarm. For authorized removal of the article, the EAS tag can be deactivated, removed or passed around the electromagnetic field to prevent detection by the EAS system.

Radio-frequency identification ("RFID") systems are also generally known in the art and may be used for a number of applications, such as managing inventory, electronic access control, security systems, and automatic identification of cars on toll roads. An RFID system typically includes an RFID reader and an RFID device. The RFID reader may transmit a radio-frequency ("RF") carrier signal to the RFID device. The RFID device may respond to the carrier signal with a data signal encoded with information stored by the RFID device.

The market need for combining EAS and RFID functions in the retail environment is rapidly emerging. Many retail stores that now have EAS for shoplifting protection rely on bar code information for inventory control. RFID offers faster and more detailed inventory control over bar coding. Retail stores already pay a considerable amount for hard tags that are re-useable. Adding RFID technology to EAS hard tags can easily pay for the added cost due to improved productivity in inventory control as well as loss prevention. Thus, the emergence of combination EAS/RFID tags.

Reusable EAS/RFID tags are typically removed from their articles before the customer exits the store. Combination EAS/RFID hard tags are affixed to their article by a clamp type mechanism. There are two types of attachment methods commonly used with combination hard tags. One is a magnetic clamp type device that uses a permanent magnet in the detacher unit to disengage the attachment pin in the combination tag for removal. The other is a mechanical spring clamp type device that uses some type of mechanical force on the attachment mechanism in the combo tag to disengage the attachment pin in the combination tag for removal. In order to remove these tags, tag detaching units are used.

Some EAS tags are removed from their articles by use of a magnetic detacher. These types of tag detaching units use strong permanent magnets to engage a magnetic type clamp located in the combination tag. These detaching units also use near field antennas to communicate with the combination tag and allow the combination tag to be rotated about the detacher magnet axis. Near field antennas could be, for example, near field UHF antennas which may be circular and may use circular meanderline geometry for use in a magnetic clamp detacher device. However, these magnetic type detaching units are ineffective with mechanical spring clamp type mechanisms used with combination hard tags.

One type of mechanical spring clamp type of tag detaching unit uses a UHF antenna to detect the combination EAS/RFID tag using a 2,450 MHz RFID element. The problem with this approach is that the wire antenna is too long to fit inside of the detaching unit housing unless it is substantially bent into almost a complete loop. It is difficult to produce an antenna of this type, the performance varies substantially with power, and it is expensive as it needs an additional 3 dB coaxial pad device for impedance matching.

Thus, there is a need for a non-magnetic detaching unit that can detach a combination EAS/RFID tag from its article.

SUMMARY OF THE INVENTION

The present invention advantageously provides an apparatus for detaching the spring clamp mechanism of a combination EAS/RFID tag from an attached article when the tag is placed within a particular region within the apparatus.

In one aspect of the invention, a detaching unit for detaching a combination electronic article surveillance/radio frequency identification tag from an article, is provided. The detaching unit includes a placement region for receiving the electronic article surveillance/radio frequency identification tag, a near field magnetic loop antenna situated proximate the placement region, and a detacher for releasing the electronic article surveillance/radio frequency identification tag from the article based on a received RFID response signal.

In another aspect of the invention, an electronic article surveillance/radio frequency identification surveillance system is provided. The electronic article surveillance/radio frequency identification surveillance system includes an electronic article surveillance/radio frequency identification tag detaching unit. The electronic article surveillance/radio frequency identification tag detaching unit includes a placement region for receiving the electronic article surveillance/radio frequency identification tag, a near field magnetic loop antenna situated proximate the placement region, and a detacher for releasing the electronic article surveillance/radio frequency identification tag from the article based on a received RFID response signal. The electronic article surveillance/radio frequency identification surveillance system further includes a radio frequency identification tag reader in electronic communication with the tag detaching unit.

In yet another aspect of the invention, a method of detaching a combination electronic article surveillance/radio frequency identification surveillance tag from its article is provided. The method includes receiving the electronic article surveillance/radio frequency identification tag in a placement region, using a near field magnetic loop antenna situated proximate the placement region to interrogate the electronic article surveillance/radio frequency identification surveillance tag via an RFID interrogation signal, and detaching the combination electronic article surveillance/radio frequency identification surveillance tag from its article at least upon verification that the interrogation results in a positive identification of the article.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

The present invention is directed toward a non-magnetic detacher unit for combination EAS/RFID tags. The invention consists of a detacher unit equipped with a mechanism which can release the spring clamp of a combination EAS/RFID tag when the clamp is placed in a particular region of the detacher. When the combination EAS/RFID tag is placed in a certain region proximate the detacher unit, the RFID information is read from the tag by a near field antenna and RFID reader allowing the spring clamp attachment mechanism in the combination tag to be removed.

Figure 1:
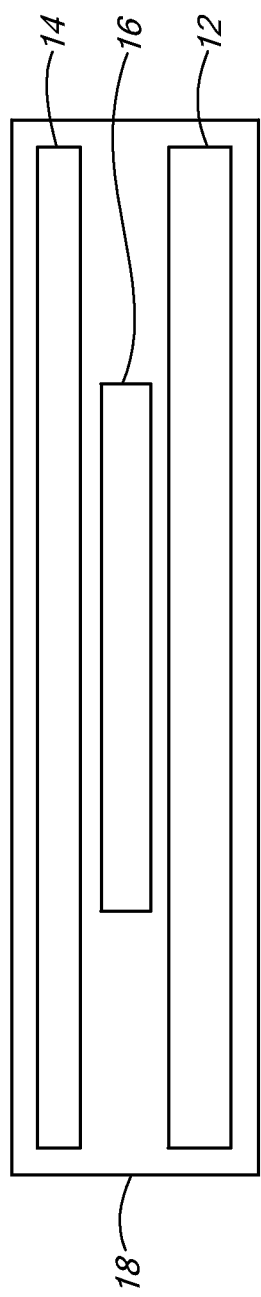
FIG. 1 illustrates a combination EAS/RFID security tag used with the tag detachment apparatus of the present invention.

Referring now to the drawing figures in which like reference designators refer to like elements, there is shown in FIG. 1 a diagram of an exemplary EAS/RFID tag used with the detaching unit of the present invention. FIG. 1 shows a combination EAS/RFID tag 10, which includes an electronic article surveillance (EAS) element 12, an RFID element 14, one or more spacing elements 16, where EAS element 12, RFID element 14 and one or more spacing elements 16 are all enclosed within a housing 18. The EAS/RFID combination tag 10 depicted in FIG. 1 is illustrative only and need not be of this exact configuration.

EAS/RFID combination tag 10 is part of an EAS/RFID interrogation system that includes a combination EAS/RFID interrogation unit (not shown) and one or more EAS/RFID combination tags 10. Each EAS/RFID combination tag 10 is removably affixable to an item. The combination EAS/RFID interrogation unit could be in the form of, for example, a reader unit used to transmit interrogation signals to EAS/RFID combination tag 10. The reader unit could include a combination EAS/RFID antenna having both EAS elements and RFID elements.

EAS element 12 may include an acousto-magnetic device having a strip of amorphous ferro-magnetic metal, where the strips are free to oscillate mechanically and are identified by their resonating response to an induced magnetic field. Alternatively, EAS element 12 may include a microwave device having a non-linear element (such as a diode) coupled to a microwave and a low frequency (LF) field antenna. One antenna emits a low-frequency (about 100 kHz) modulation field, and another one emits a microwave field (UHF frequency), where the non-linear device acts as a mixer reemitting a combination of signals from both fields to trigger an alarm. Additional suitable EAS devices and/or tags as known in the art may be equally suitable for use with present invention.

One or more spacing elements 16 are situated in housing 18 and between EAS element 12 and RFID element 14. Each spacing element 16 may define a substantially planar body having non-conductive and/or dielectric properties, and may be constructed from a nonconductive plastic, polymer, or other suitable insulating material. For example, spacing element 16 may constitute a substantially rectangular-shaped portion of insulating foam, where the spacing element has a thickness of less than approximately 3 mm.

Figure 2:
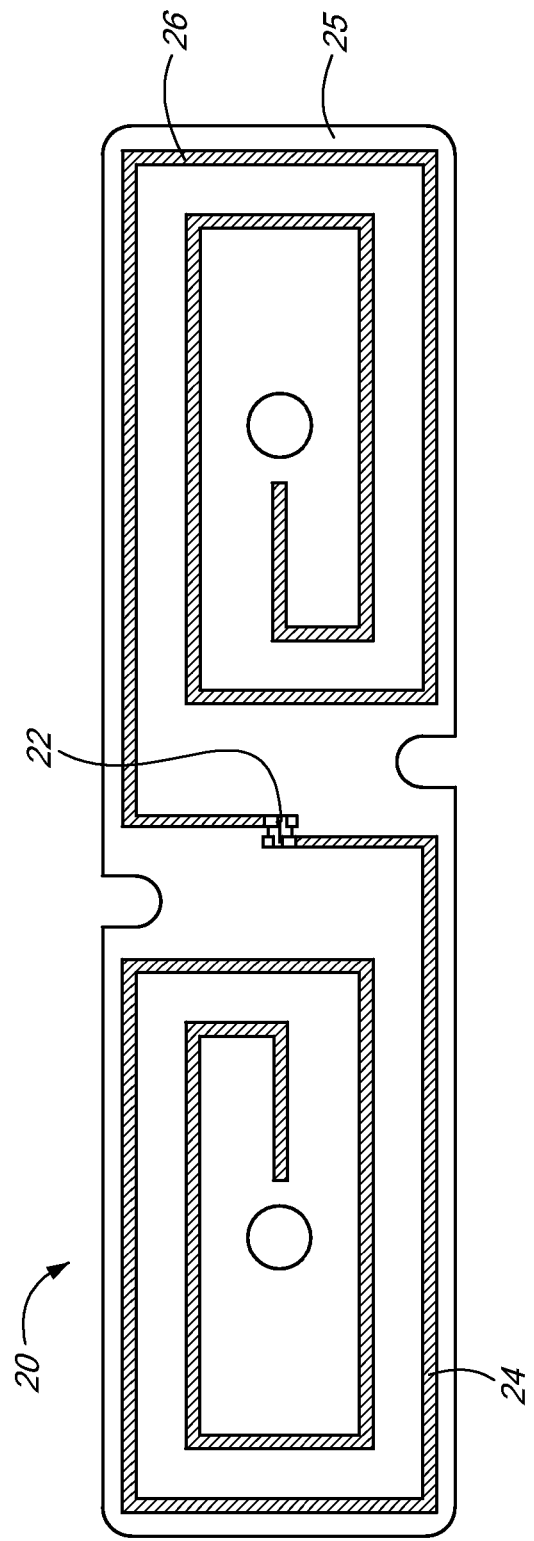
FIG. 2 illustrates the RFID element of the combination EAS/RFID security tag having a spiral antenna inlay.

The RFID element 14 of EAS/RFID combination tag 10 includes an RFID antenna inlay 20, a sample of which is depicted in FIG. 2. RFID antenna inlay 20 may include a patterned configuration of conductive material in electrical communication with an IC component 22 to transmit a signal both to and from the IC component 22. The pattern of the antenna inlay 20 may be modified and/or selected to provide desired impedance characteristics to compliment the electrical characteristics of the IC component 22 for optimal use and performance of RFID element 14. Of note, the antenna inlay pattern 20 shown in the figures is merely exemplary, it being understood that other patterns are possible.

The IC component 22 may generally include an integrated circuit device capable of storing multiple bits of data, and may further be capable of modulating current in the antenna 20 of the RFID element 14 to thereby encode data onto an RF signal. In particular, IC component 22 may include a semiconductor-based device, such as a silicon chip, and may further include active and/or passive elements such as transistors, resistors, capacitors, and the like, integrated thereon. For example, the IC component 22 may include a passive network of resistors, capacitors, and/or inductors that exhibits a resonance response to an incoming RF signal. In addition, the IC component 22 may include a diode device to simply rectify the incoming RF signal. The IC component 22 may further include a fixed response frequency and/or identifying data pattern, and alternatively may include a response frequency and/or identifying data pattern that is programmable and/or re-programmable.

The components of RFID antenna inlay 20 may be comprised of a material having sufficiently high electrical conductivity, such as a metallic material comprising copper (Cu) or aluminum (Al), or a microwave conductive carbon fiber. Antenna inlay 20 may incorporate different types of antenna configurations. One type of antenna configuration, shown in FIG. 2, may be a spiral antenna configuration of the type disclosed in U.S. Pat. No. 7,302,790, the entirety of which is incorporated herein by reference. Two inward spiral antenna sections 24 and 26 are connected to IC component 22 on a substrate 25. With the spiral antenna configurations of the type shown in FIG. 2, the coupling mechanism depends mainly on the electric (E) field and not the magnetic (H) field. Thus, by incorporating a spiral antenna configuration of FIG. 2, the overall RFID read performance is optimized for the far field.

Figure 3:
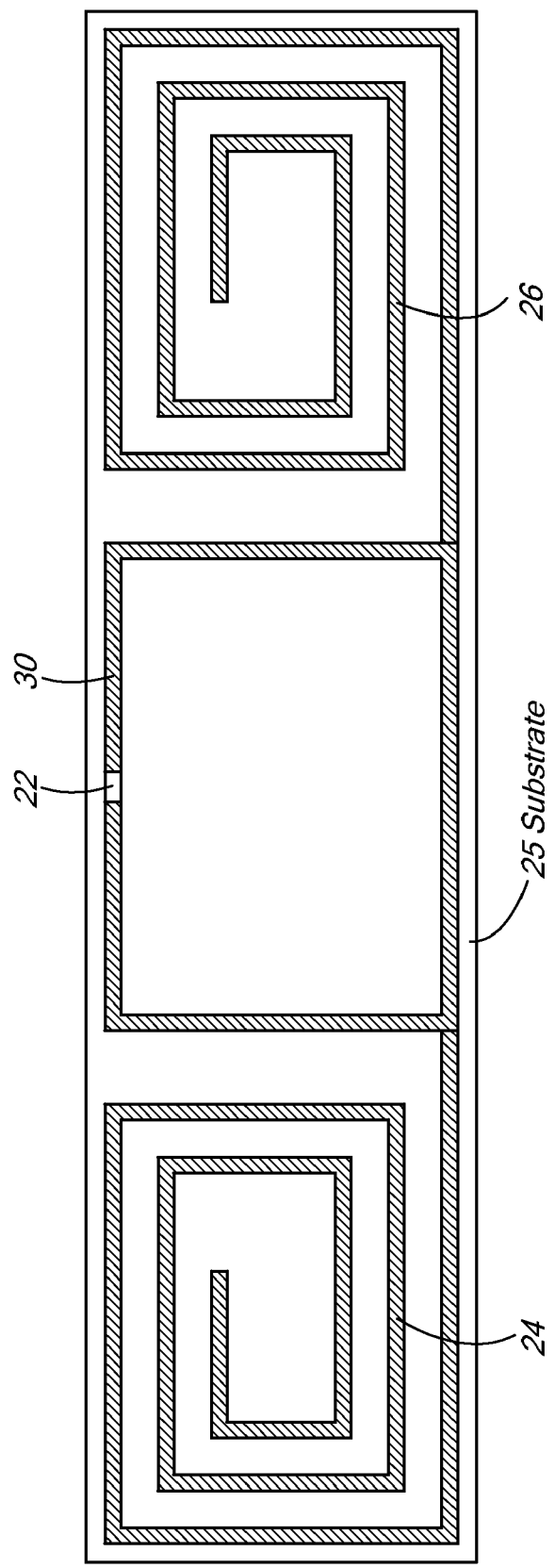
FIG. 3 illustrates the RFID element of the combination EAS/RFID security tag having a hybrid antenna inlay.

Alternately, a hybrid antenna inlay 28 of the type shown in FIG. 3 may be used. Hybrid antenna inlay 28 includes a spiral antenna consisting of two inward spiral antenna sections 24 and 26, as well as a rectangular magnetic loop antenna 30 coupled to the inward spiral antennas 24 and 26 on substrate 25. IC component 22 connects to magnetic loop antenna 30 and magnetic loop antenna 30 is connected to the inward spiral antennas 24 and 26. The overall geometry of magnetic loop antenna 30 is such that the near field magnetic (H) performance is optimized. Spiral antennas 24 and 26 dominate the far field response.

Figure 4:
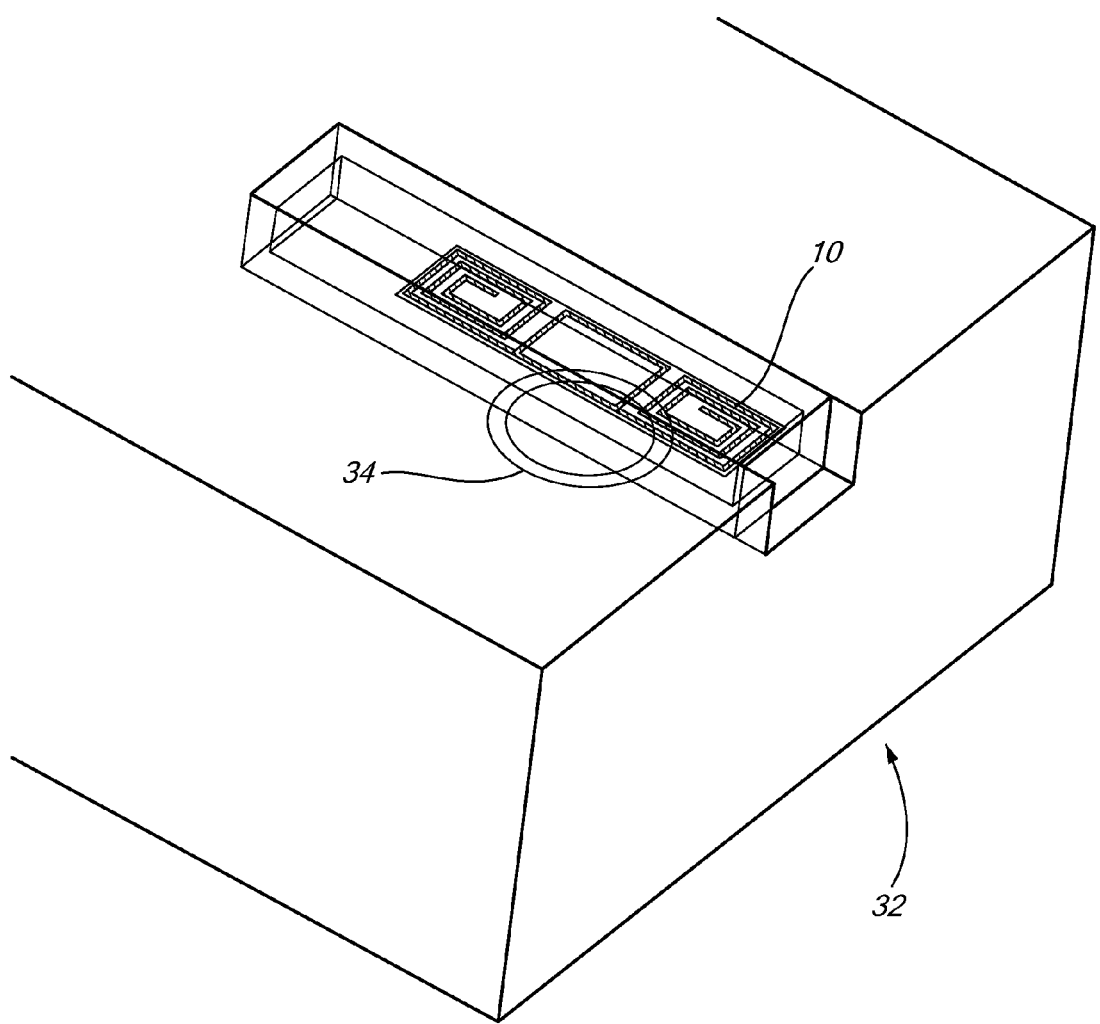
FIG. 4 illustrates the tag detachment apparatus of the present invention, showing the magnetic loop antenna inside of the detacher unit.

FIG. 4 illustrates a tag detachment unit 32 that is equipped to release a mechanical spring clamp mechanism used to affix EAS/RFID tag 10 to an article. A mechanical spring clamp is typically used to attach an EAS/RFID tag 10 to the article. In one embodiment, tag detachment unit 32 includes a housing equipped with a substantially circular near field magnetic loop antenna 34, as shown in FIG. 4. When EAS/RFID tag 10 needs to be detached from its article, tag 10 is placed in the housing within a placement region 36 just above the magnetic loop antenna 34. An RFID reader sends interrogation signals to tag 10 via loop antenna 34 in order to read the RFID code, which identifies the article to which tag 10 is attached. Once the RFID reader interrogates tag 10, it enables the tag detachment unit 32 to release the spring clamp mechanism on the EAS/RFID tag 10, thus allowing the tag 10 to be removed from the article it is attached to.

In order for the circular magnetic near field loop antenna 34 to operate efficiently, it should be impedance-matched to the RFID reader. Typically, reader units in RFID security systems have an impendence of approximately 50 ohms. The current around circular magnetic near field loop antenna 34 must be optimized not only in amplitude, but the phase variation of the current around the loop must also be minimized. Otherwise, the magnetic field above circular magnetic near field loop antenna 34 will be diminished at a given distance. In general terms, this means that the loop diameter d should be $$d < \frac{c}{2\pi f \sqrt{\varepsilon_r}},$$

where c is the speed of light, f is the UHF operating frequency, and $\in_r$ is the relative dielectric constant of the antenna substrate material (not shown). This infers that the phase variation around the circular magnetic loop antenna is limited.

In one embodiment of the present invention, for UHF frequencies, e.g., 868, 915 MHz, magnetic loop antenna 34 is a circular microstrip with a diameter of approximately 2 centimeters on a FR4 dielectric substrate having a thickness of approximately of 1.5 millimeters, with a copper groundplane on the bottom side. The circular microstrip width is approximately 1 millimeter wide.

In another embodiment, loop antenna 34 is coupled to the RFID reader via a coaxial cable or microstrip feed directly coupled to the reader unit. Other electronic coupling devices and mechanisms are contemplated as being compatible with the disclosed invention. A transformer may be used to couple the RFID reader feed to antenna 34. This transformer could be a step-down transformer in order to drive more current into loop antenna 34. One or more capacitors may be placed at the halfway point between the antenna feed end and the opposite end where a resistor can be placed in series. The resistor and two capacitors aid in impedance matching and tuning antenna 34 to the 50 ohm source impedance of the RFID reader coupled to the antenna through the transformer. Loop antenna 34 may also include a cylindrical slug of ferrite material. The invention is not limited to a particular diameter or type of loop antenna 34.

In another embodiment, rather than a coaxial cable or microstrip feed coupling the RFID reader to antenna 34, an onboard RFID reader could be situated within the same detachment unit housing as antenna 34. In this embodiment, instead of the RFID reader being located remotely and connected to loop antenna 34, the detaching unit contains the RFID reader as well as the detachment mechanism used to disengage the combination EAS/RFID tag from its article. In one embodiment, an onboard printed circuit board contains both antenna 34 and the RFID reader.

The RFID reader has circuitry to enable it to transmit interrogation signals to the tag 10 in order to determine the identity of the article to which the tag 10 is attached. The detachment mechanism, described above, can then be used to detach the tag 10 from its article. In this embodiment, the RFID reader is located onboard a printed circuit board, along with the magnetic loop antenna 34 thus obviating the need for cables or wires to electronically couple loop antenna 34 to a remote RFID reader.

Tag detachment unit 32 may be used to detach combination EAS/RFID tags 10 that employ the dual-spiral antenna inlay 20 shown in FIG. 2, the hybrid antenna inlay 28 shown in FIG. 3, or any variations of antenna inlay configurations used for combination EAS/RFID tags.

Other security tag detaching devices specifically cover the magnetic clutch type of combination EAS/RFID tag configurations where a permanent magnet in the detacher unit is used to detach the attachment pin on the combination EAS/RFID tag upon validation of the RFID code read by the RFID reader. The present disclosure describes a non-magnetic detaching unit a for detaching a spring clamp used with a combination EAS/RFID tag 10 in order to release the attached article, where the EAS/RFID tag 10 may incorporate a spiral antenna inlay or a hybrid antenna inlay. Tag detachment unit 32 incorporates a circular magnetic loop near field antenna 34 that senses the presence of a combination EAS/RFID tag 10 in the placement region of the housing and releases the spring clamp when the clamp is placed in a particular region of the tag detachment unit 32.

Figure 5:
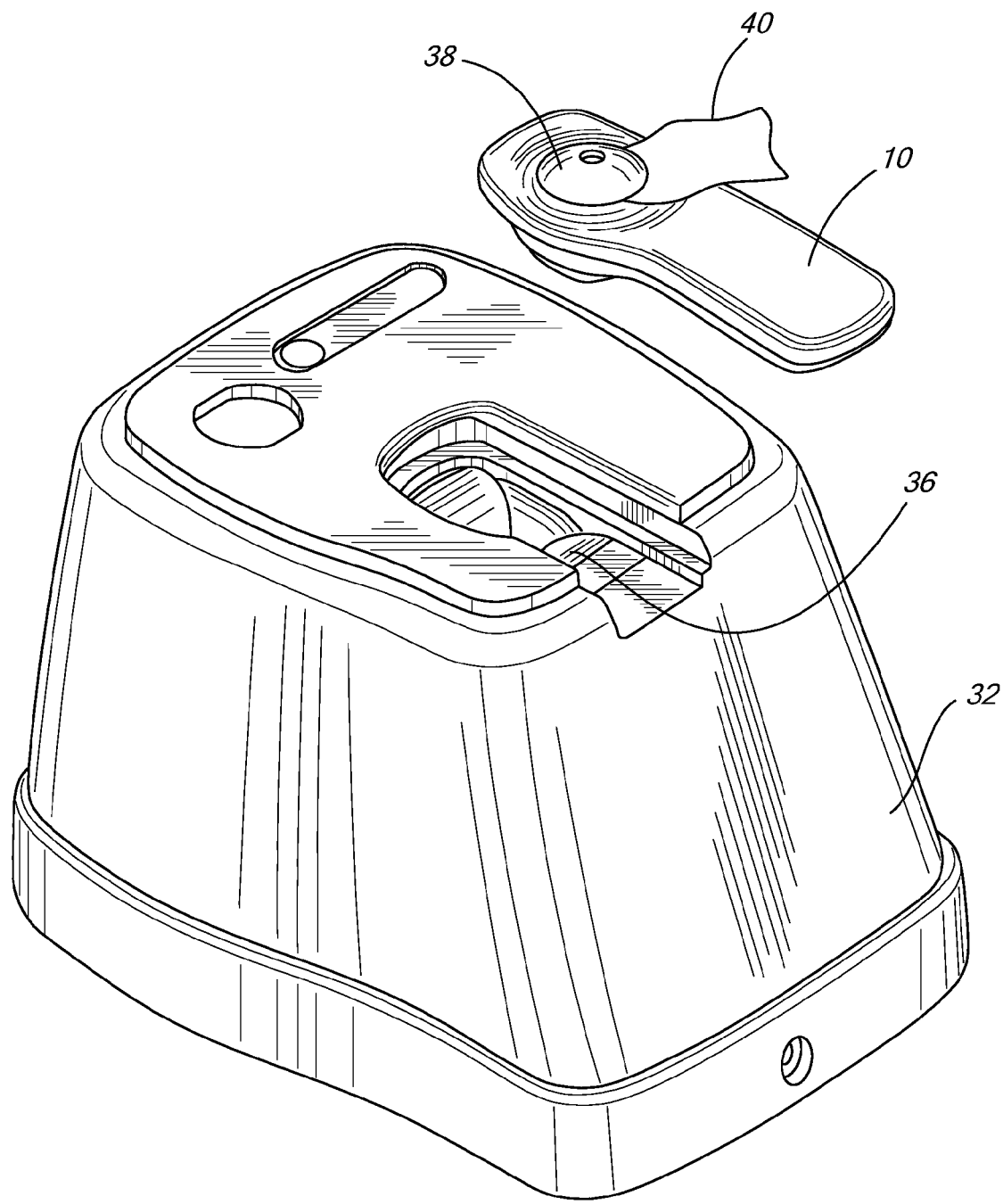
FIG. 5 illustrates a perspective view of an exemplary tag detachment apparatus of the present invention for use with a mechanical spring clamp-based tag mechanism.

FIG. 5 illustrates a perspective view of the tag detachment unit 32 and its placement region 36 for receiving combination EAS/RFID tag 10. Tag detachment unit 32 includes a placement region 36 for receiving combination EAS/RFID tag 10, and a detacher 42 (shown in FIG. 6) for releasing tag 10 from its article 40. In order to remove tag 10 from its article 40, tag 10 is placed in region 36 of detachment unit 32. Near field antenna 34 (shown in FIG. 4) is situated proximate the placement region 36. Tag 10, when placed within the placement region 36 is substantially situated over near field antenna 34. Antenna 34 is electrically coupled to an RFID reader. Antenna 34 receives RFID signals from tag 10 and transmits them to the RFID reader. Once a positive identification of article 40 occurs, the RFID reader transmits a signal to antenna 34, which instructs the detacher 42 to release tag 10 from its article 40.

Figure 6:
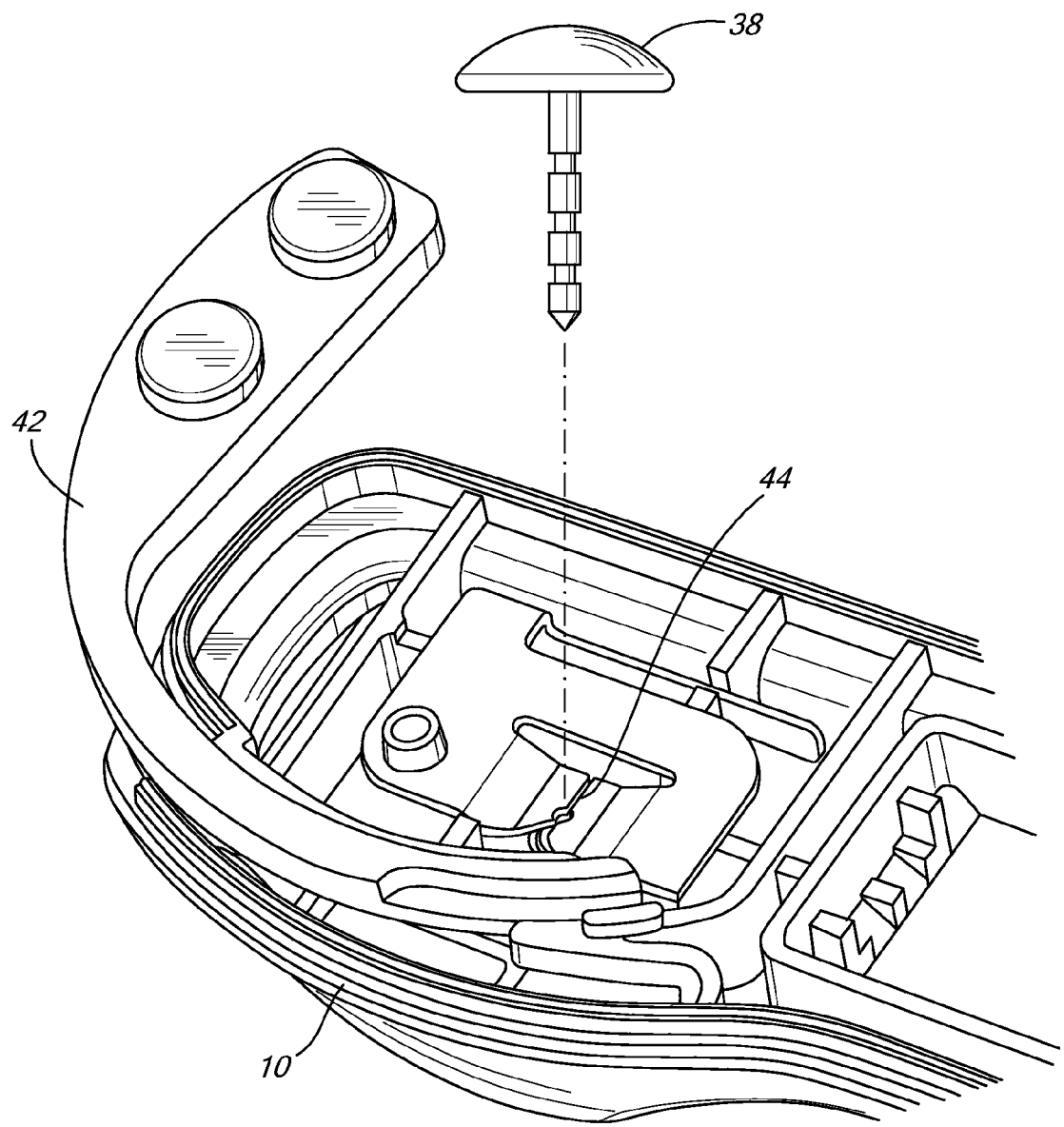
FIG. 6 illustrates an exemplary detacher portion of the tag detachment unit of the present invention in operation with a mechanical spring clamp-based tag.

FIG. 6 provides an exploded view of an exemplary embodiment of an interior portion of tag 10, which is situated within detaching unit 32 in placement region 36 in order to release the tag 10 from its article 40. Pin 38 serves to secure article 40 to tag 10 by trapping at least a portion of article 40 when the distal end of pin 38 is clamped within a pair of spring-loaded clamp jaws 44. When the RFID reader transmits a positive article identification signal to antenna 34, which is situated within detaching unit 32, detacher 42 separates jaws 44 in order to release pin 38 and article 40. Thus, unlike magnetic clutch detachers, which allow the tag to be rotated about the detacher magnet axis, the spring type clamp mechanism used with the detacher unit 32 of the present invention requires the tag to be situated in a fixed position in the placement region while detacher 42 engages tag 10 and releases the clamp jaws 44 upon the identification of article 40 by the RFID reader.

Figure 7:
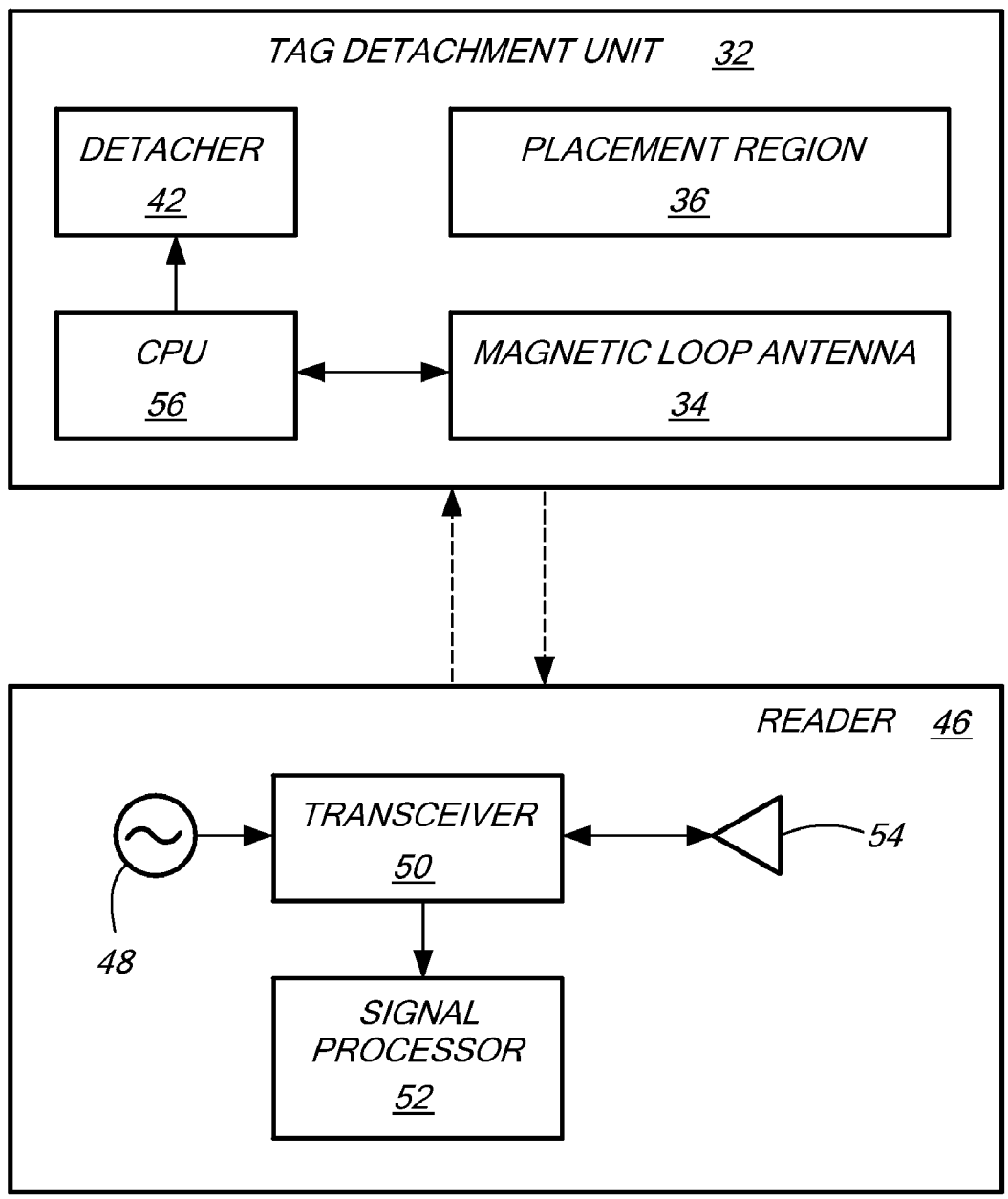
FIG. 7 illustrates a block diagram of an EAS/RFID security system incorporating the tag detachment apparatus of the presenting invention.

FIG. 7 is a block diagram of an exemplary EAS/RFID article identification and surveillance system utilizing the detacher unit 32 of the present invention. Detacher unit 32 is in electrical communication with RFID reader 46. RFID reader can be located remotely within the EAS/RFID article identification and surveillance system or, as described above, may be also located in detacher unit 32. RFID reader 46 contains an RF signal generator 48, transceiver 50, antenna 54 and a signal processor 52. It is noted that the RFID reader 46 depicted in FIG. 7 is exemplary in nature and other RFID readers having other designs with different hardware and software components are also contemplated. Tag 10 is situated within placement region 36 ad proximate magnetic loop antenna 34, as discussed above. Upon receipt of a response signal from reader 46, detacher 42 releases the clamp mechanism (clamp jaws 44) that affixes tag 10 to its article 40. In one embodiment, detacher unit 32 also contains a processor 56, which can provide signals to detacher 42 instructing it to release tag 10 from its article 40 upon verification that the tag is authorized to be released from the article, i.e., that detacher 42 should be actuated. For example, detacher 42 can be actuated when an evaluation of the received RFID signal indicates that article 40 is not being stolen.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A detaching unit for detaching a combination electronic article surveillance/radio frequency identification tag that is affixed to an article by a spring clamp mechanism, the tag having a tag magnetic loop antenna, the detaching unit comprising:
   a placement region for receiving the electronic article surveillance/radio frequency identification tag;
   a near field magnetic loop antenna situated proximate the placement region, the near field magnetic loop antenna magnetically coupling to the tag magnetic loop antenna, the near field magnetic loop antenna is substantially circular, includes a substrate material having a relative dielectric constant, and has a diameter "d" in which $$d < \frac{c}{2\pi f \sqrt{\varepsilon_r}},$$

wherein "c" is the speed of light, "f" is the UHF operating frequency, and "$\varepsilon_r$" is the relative dielectric constant of the substrate material; and
   a detacher, the detacher releasing the electronic article surveillance/radio frequency identification tag from the article based on a received radio frequency identification response signal.

2. The detaching unit of claim 1, wherein the detacher releases the electronic article surveillance/radio frequency identification tag from the article when the electronic article surveillance/radio frequency identification tag is placed proximate the near field magnetic loop antenna.

3. The detaching unit of claim 1, wherein the near field magnetic loop antenna has an impedance that is substantially equal to the impedance of the radio frequency identification tag reader.

4. The detaching unit of claim 1, wherein the near field magnetic loop antenna is coupled to a radio frequency identification tag reader in order to receive article identification signals from the tag reader.

5. The detaching unit of claim 1, further comprising a radio frequency identification tag reader, wherein the radio frequency identification tag reader is located within the detaching unit.

6. The detaching unit of claim 5, wherein the detaching unit includes a printed circuit board, the radio frequency identification tag reader and the near field magnetic loop antenna being situated on the same printed circuit board.

7. The detaching unit of claim 1, wherein the electronic article surveillance/radio frequency identification tag includes an electronic article surveillance component, a radio frequency identification component, and a spacer positioned between the electronic article surveillance component and the radio frequency identification component.

8. The detaching unit of claim 7 wherein the radio frequency identification component includes a spiral antenna inlay.

9. The detaching unit of claim 8, wherein the spiral antenna inlay includes two or more spiral loop antennas.

10. The detaching unit of claim 7, wherein the radio frequency identification component includes a hybrid antenna inlay, the hybrid antenna including the tag magnetic loop antenna situated between two spiral loop antennas.

11. An electronic article surveillance/radio frequency identification surveillance system, the electronic article surveillance/radio frequency identification surveillance system comprising:
   an electronic article surveillance/radio frequency identification tag detaching unit; the electronic article surveillance/radio frequency identification tag detaching unit including:
      a placement region for receiving an electronic article surveillance/radio frequency identification tag;
      a near field magnetic loop antenna situated proximate the placement region, the near field magnetic loop antenna magnetically coupling to a magnetic loop antenna on the electronic article surveillance/radio frequency identification tag, the near field magnetic loop antenna is substantially circular, includes a substrate material having a relative dielectric constant, and has a diameter "d" in which $$d < \frac{c}{2\pi f \sqrt{\varepsilon_r}},$$

wherein "c" is the speed of light, "f" is the UHF operating frequency, and "$\varepsilon_r$" is the relative dielectric constant of the substrate material; and
      a detacher, the detacher for releasing the electronic article surveillance/radio frequency identification tag from the article based on a received radio frequency identification response signal; and
   a radio frequency identification tag reader in electronic communication with the tag detaching unit.

12. The electronic article surveillance/radio frequency identification surveillance system of claim 11, the radio frequency identification tag reader comprising:
- transmit circuitry configured to output an interrogation signal to the electronic article surveillance/radio frequency identification tag; and
- receive circuitry configured to receive a response signal from the electronic article surveillance/radio frequency identification tag in response to the interrogation signal.

13. The electronic article surveillance/radio frequency identification surveillance system of claim 11, wherein the radio frequency identification response signal is evaluated and wherein the detacher is actuated to release the electronic article surveillance/radio frequency identification tag based on an indication that the article is not being stolen.

14. The electronic article surveillance/radio frequency identification surveillance system of claim 11, wherein the near field magnetic loop antenna is has a diameter of approximately two centimeters.

15. The electronic article surveillance/radio frequency identification surveillance system of claim 11, wherein the electronic article surveillance/radio frequency identification tag includes an electronic article surveillance component, a radio frequency identification component and a spacer component situated between the electronic article surveillance component and the radio frequency identification component.

16. The electronic article surveillance/radio frequency identification surveillance system of claim 15, wherein the radio frequency identification component includes two spiral loop antennas.

17. The electronic article surveillance/radio frequency identification surveillance system of claim 16, wherein the radio frequency identification component further includes the tag magnetic loop antenna situated between two spiral loop antennas.

18. A method of detaching a combination electronic article surveillance/radio frequency identification surveillance tag from its article, the tag having a tag magnetic loop antenna, the method comprising:
- receiving the electronic article surveillance/radio frequency identification tag in a placement region;
- using a near field magnetic loop antenna situated proximate the placement region to interrogate the electronic article surveillance/radio frequency identification tag via a radio frequency identification interrogation signal, the near field magnetic loop antenna magnetically coupling to the tag magnetic loop antenna, the near field magnetic loop antenna is substantially circular, includes a substrate material having a relative dielectric constant, and has a diameter "d" in which $$d < \frac{c}{2\pi f \sqrt{\varepsilon_r}},$$

wherein "c" is the speed of light, "f" is the UHF operating frequency, and "$\varepsilon_r$" is the relative dielectric constant of the substrate material; and
- detaching the combination electronic article surveillance/radio frequency identification surveillance tag from its article at least upon verification that the interrogation results in a positive identification of the article.

19. The method of claim 18, wherein detaching the combination article surveillance/radio frequency identification surveillance tag further includes confirming that the article is not stolen.

* * * * *